US012510332B2

(12) United States Patent
Isquith

(10) Patent No.: US 12,510,332 B2
(45) Date of Patent: Dec. 30, 2025

(54) HIGH-VISIBILITY BALLISTIC SAFETY VEST

(71) Applicant: AMULET CRITICAL INFRASTRUCTURE, INC., Scottsdale, AZ (US)

(72) Inventor: Jeffrey Isquith, Scottsdale, AZ (US)

(73) Assignee: AMULET CRITICAL INFRASTRUCTURE, INC., Scottsdale, AZ (US)

( * ) Notice: Subject to any disclaimer, the term of this patent is extended or adjusted under 35 U.S.C. 154(b) by 0 days.

(21) Appl. No.: 18/408,203

(22) Filed: Jan. 9, 2024

(65) Prior Publication Data

US 2024/0230280 A1 Jul. 11, 2024

Related U.S. Application Data

(60) Provisional application No. 63/479,017, filed on Jan. 9, 2023.

(51) Int. Cl.
*F41H 1/02* (2006.01)
*F41H 5/013* (2006.01)
(Continued)

(52) U.S. Cl.
CPC ............... *F41H 1/02* (2013.01); *F41H 5/013* (2013.01); *G08B 21/02* (2013.01); *G08B 25/00* (2013.01); *G08B 21/182* (2013.01)

(58) Field of Classification Search
CPC ........... F41H 1/02; F41H 5/013; G08B 21/02; G08B 21/182
(Continued)

(56) References Cited

U.S. PATENT DOCUMENTS

| | | | | |
|---|---|---|---|---|
| 11,378,360 | B1 * | 7/2022 | Monat | F41H 1/00 |
| 2012/0246788 | A1 * | 10/2012 | Harrell | A41D 13/0155 2/243.1 |

(Continued)

FOREIGN PATENT DOCUMENTS

| | | | | |
|---|---|---|---|---|
| CN | 215984210 U | * 3/2022 | | |
| WO | WO-2011134068 A1 | * 11/2011 | | F41H 1/02 |

(Continued)

OTHER PUBLICATIONS

CN 215984210 (Yang) (Year: 2022).*

*Primary Examiner* — Samir Abdosh
(74) *Attorney, Agent, or Firm* — Perkins Coie LLP; Alberto Araiza; John Fuller

(57) ABSTRACT

The system comprises a vest. The vest comprises one or more exterior pockets and multiple interior pockets configured to house a ballistic panel and at least one sensor. The front and back of the vest contain at least one interior pocket. The system comprises at least one ballistic panel configured to be housed in the interior pocket of the vest. The ballistic panel is removable from the interior pocket and constructed from a ballistic-resistant material. The system comprises a ballistic detection system. The ballistic detection system comprises at least one sensor capable of detecting a ballistic energy level and energy waveform. The sensor is mounted to the ballistic panel. The system comprises a notification system that generates a notification to an emergency service when at least one sensor detects a ballistic event. The system comprises a power supply configured to supply power to the ballistic detection system.

20 Claims, 11 Drawing Sheets

(51) Int. Cl.
*G08B 21/02* (2006.01)
*G08B 25/00* (2006.01)
*G08B 21/18* (2006.01)

(58) Field of Classification Search
USPC .......................................................... 89/36.05
See application file for complete search history.

(56) References Cited

U.S. PATENT DOCUMENTS

| | | | | |
|---|---|---|---|---|
| 2014/0184407 | A1* | 7/2014 | Patil | G08B 21/02 340/539.11 |
| 2015/0059042 | A1* | 3/2015 | Aquino | A41B 1/08 2/2.5 |
| 2017/0082403 | A1* | 3/2017 | Aquino | F41H 1/02 |
| 2019/0371161 | A1* | 12/2019 | Brinkley | G08B 27/006 |

FOREIGN PATENT DOCUMENTS

| | | | | |
|---|---|---|---|---|
| WO | WO-2017136936 | A1 * | 8/2017 | B32B 3/06 |
| WO | WO-2018075108 | A1 * | 4/2018 | A41D 13/015 |
| WO | WO-2021226315 | A1 * | 11/2021 | F41H 1/02 |

* cited by examiner

HIGH-VISIBILITY BALLISTIC SAFETY VEST

CROSS-REFERENCE TO RELATED APPLICATION

The application claims priority to U.S. Provisional Pat. App. No. 63/479,017, filed Jan. 9, 2023, titled Methods and Apparatus for High Visibility Ballistic Safety Vest, and is hereby incorporated by reference in its entirety.

BACKGROUND

A bulletproof vest, also known as a ballistic vest or a bullet-resistant vest, is an item of body armor that helps absorb the impact of and reduce or stop penetration to the torso by firearm-fired projectiles and fragmentation from explosions. The vest can come in a soft form, as worn by many police officers, prison officers, security guards, and some private citizens, used to protect against forced penetration attacks or light projectiles, or hard form, using metallic or para-aramid components.

BRIEF DESCRIPTION OF THE DRAWINGS

Detailed descriptions of implementations of the present invention will be described and explained through the use of the accompanying drawings.

Figure 1A:
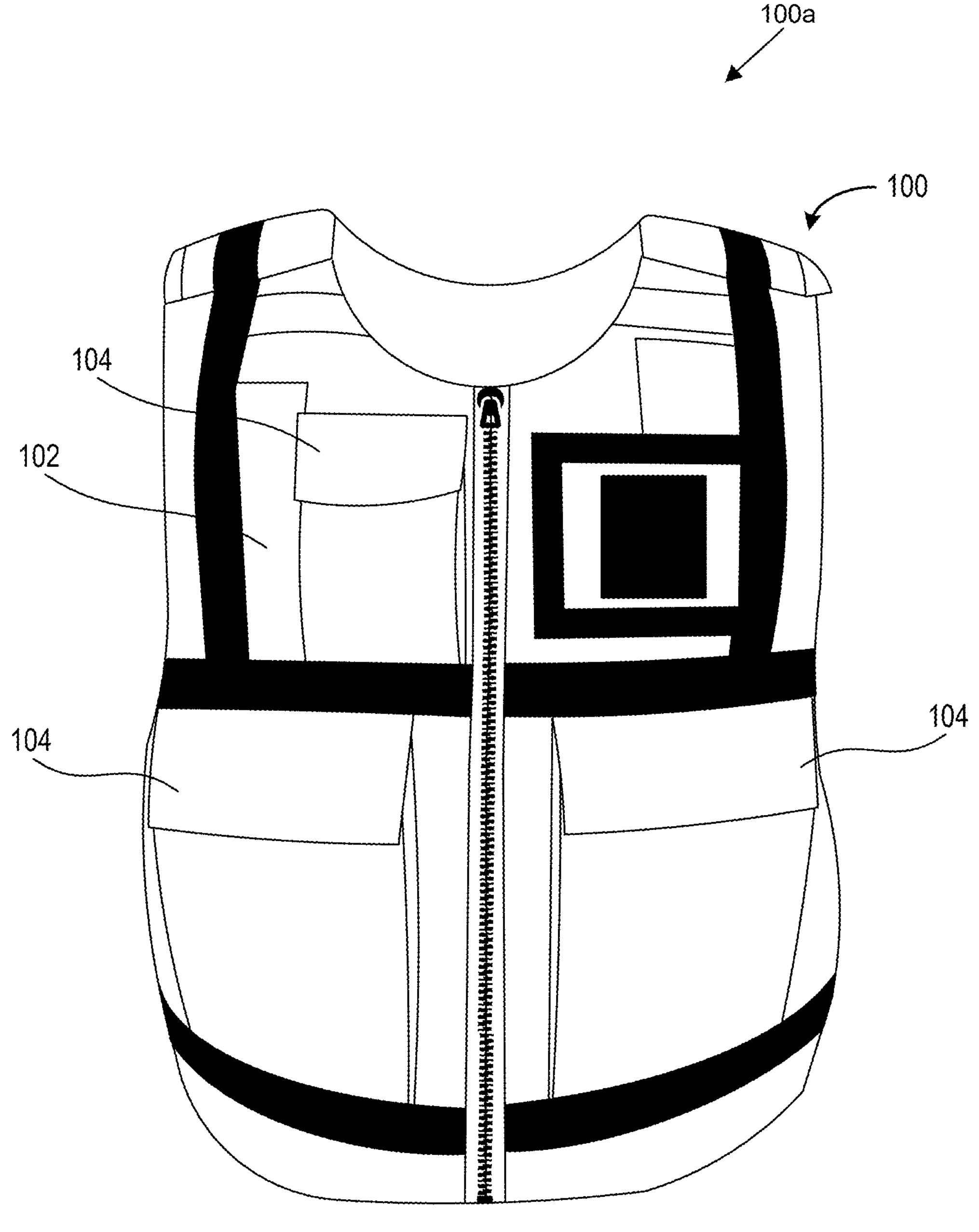
FIG. 1*a* is an embodiment of a front-facing view of the vest component of the modular ballistic vest.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to a modular ballistic vest including a variety of sensors. Ballistic vests are commonly utilized in non-civilian uses by military and police personnel to provide protection from bullets and other ballistics. A ballistic vest, though, can be a vital piece of safety equipment for many civilian applications. For example, a ballistic vest can be deployed by utility workers to protect against arcing or exploding transformers or other electrical equipment. Current ballistic vests are primarily designed for non-civilian uses, causing the vests to lack the features required to protect many civilian wearers.

The disclosed technology relates to a modular ballistic vest that includes a variety of sensors allowing civilian wearers to receive protection similar to that of non-civilian wearers. In one embodiment, the ballistic vest can be a high-visibility ballistic safety vest that generally comprises an outer shell with a visible or reflective front-facing surface and a visible or reflective rear-facing surface. One or more exterior pockets can be distributed across at least a portion of the front-facing surface. The high-visibility ballistic safety vest can also include multiple internal pockets, sleeves, or compartments, which are not visible from the exterior of the high-visibility ballistic safety vest and are configured to house or otherwise at least one of a ballistic panel, stab panels, sensor, accelerometer, power supply, camera, or activation button. In one embodiment, the ballistic panel is removable from the interior pocket, which, for example, can allow for the cleaning of the vest with at-home methods such as with a washing machine.

The ballistic panel can include any suitable device for protecting the torso of a wearer against projectiles, airborne shrapnel, punctures, and sharp objects. The ballistic panel can be formed as ultra-lightweight and thin, hidden ballistic barriers configured to provide protection from a full spectrum of bullets, blast fragmentation, and forced penetration. The ballistic panel can be manufactured from any suitable material, such as non-woven aramid, ultra-high-molecular-weight polyethylene (UHMPE), or other composites. In one embodiment, the ballistic panel can be formed from materials that are light in weight and thickness to provide for minimal weight and flexibility while also meeting desired ballistic performance standards (e.g., National Institute of Justice/Underwriters Laboratories (UL)).

In one embodiment, the sensor can be linked to or otherwise connected to one or more ballistic panels and be configured to detect the occurrence of a gunshot, penetration, ballistic fragmentation, or other ballistic event. The sensor can comprise any suitable system or device for detecting an event. For example, the sensor can use energy wave technology to detect and measure the energy level and waveform of the ballistic event. A singular energy wave sensor can detect a ballistic event in a predetermined radius around the ballistic vest, allowing detection of the ballistic event in scenarios when no ballistic fragmentation makes contact with the ballistic vest. In another embodiment, the sensor can be configured to autonomously notify first responders, security personnel, or other stakeholders of a detected event. The sensor can be configured to wirelessly transmit data concerning the detected event, such as location, time, or the type of event detected.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Ballistic Vest

FIG. 1*a* illustrates an embodiment 100*a* of a front-facing view of the vest component of the modular ballistic vest. The vest 100 can be a high-visibility ballistic vest, and the front material 102 can be constructed of a reflective or high-visibility outer material. The front material 102 can additionally be a highly durable material. In one embodiment, the front material 102 is constructed of a flame-retardant material to protect against fire and ballistic events. In another embodiment, the front material 102 complies with required safety protocols such as the Occupational Safety and Health Administration (OSHA) or American National Standards Institute (ANSI) standards. The front material 102 can be a bright color such as yellow or orange and include one or more reflective surfaces to enhance visibility in dark environments. The vest 100 can contain multiple exterior pockets 104. The multiple exterior pockets 104 can be distributed over the front exterior surface of the vest 100. In another embodiment, exterior pockets 104 can have a corresponding internal pocket, sleeve, or compartment (not shown), which can be configured to contain at least one ballistic panel and/or sensor.

Figure 1B:
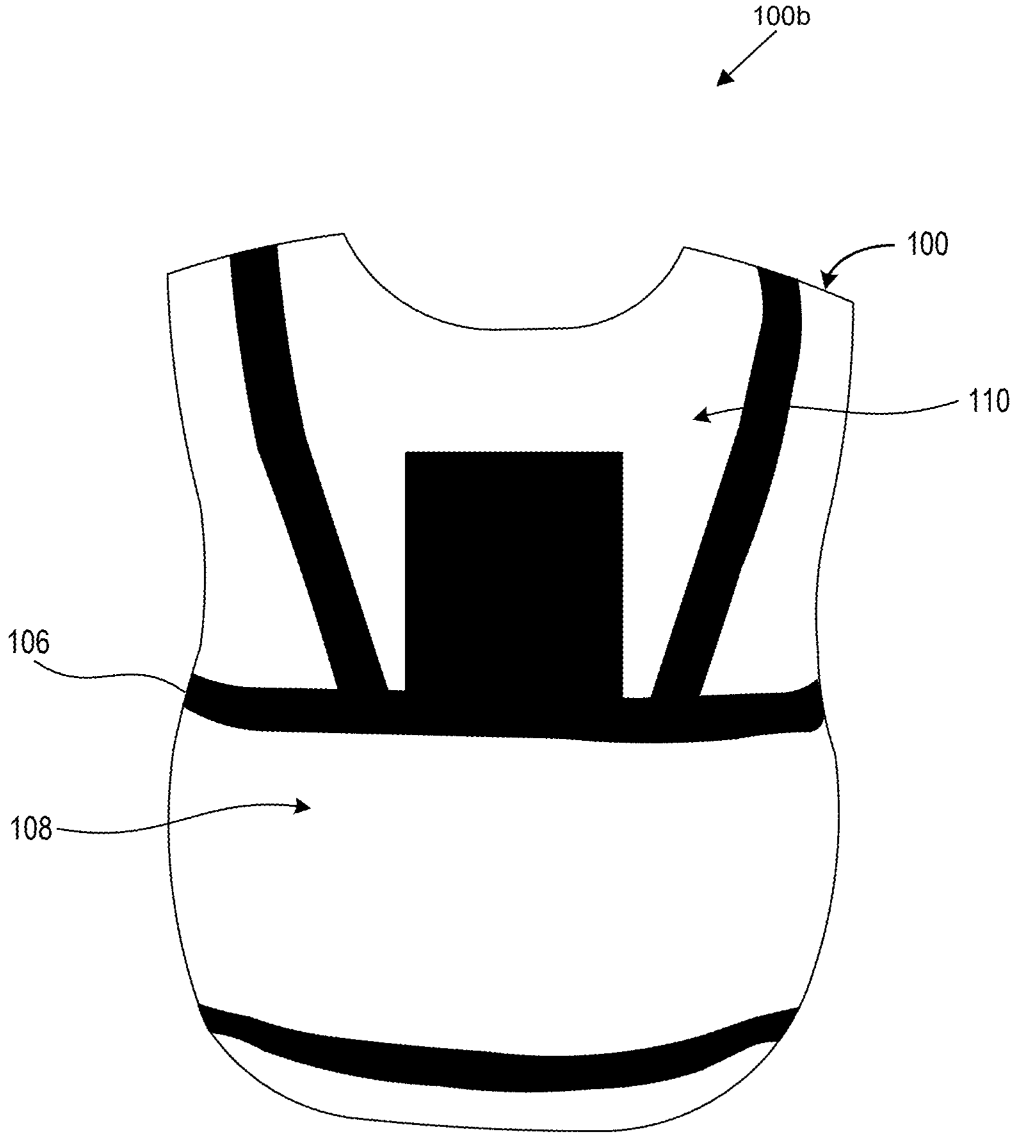
FIG. 1*b* is an embodiment of a rear-facing view of the vest component of the modular ballistic vest.

FIG. 1*b* illustrates an embodiment 100*b* of a rear-facing view of the vest component of the modular ballistic vest. The vest 100 can be a high-visibility ballistic vest, and the rear material 106 can be constructed of a reflective or high-visibility outer material. The rear material 106 can additionally be a highly durable material. In one embodiment, the rear material 106 is constructed of a flame-retardant material to protect against fire and ballistic events. In another embodiment, the rear material 106 complies with required safety protocols such as the OSHA or ANSI standards. The rear material 106 can be a bright color such as yellow or orange and include one or more reflective surfaces to enhance visibility in dark environments. A set of internal pockets 108, 110 (not shown) can be configured to contain at least one ballistic panel and/or sensor. The vest 100 may also be configured with a harness, D-Ring, or grounding connector. For example, the grounding connector can protect a wearer from electrocution by grounding the wear with a connectable grounding strap.

Figure 2:
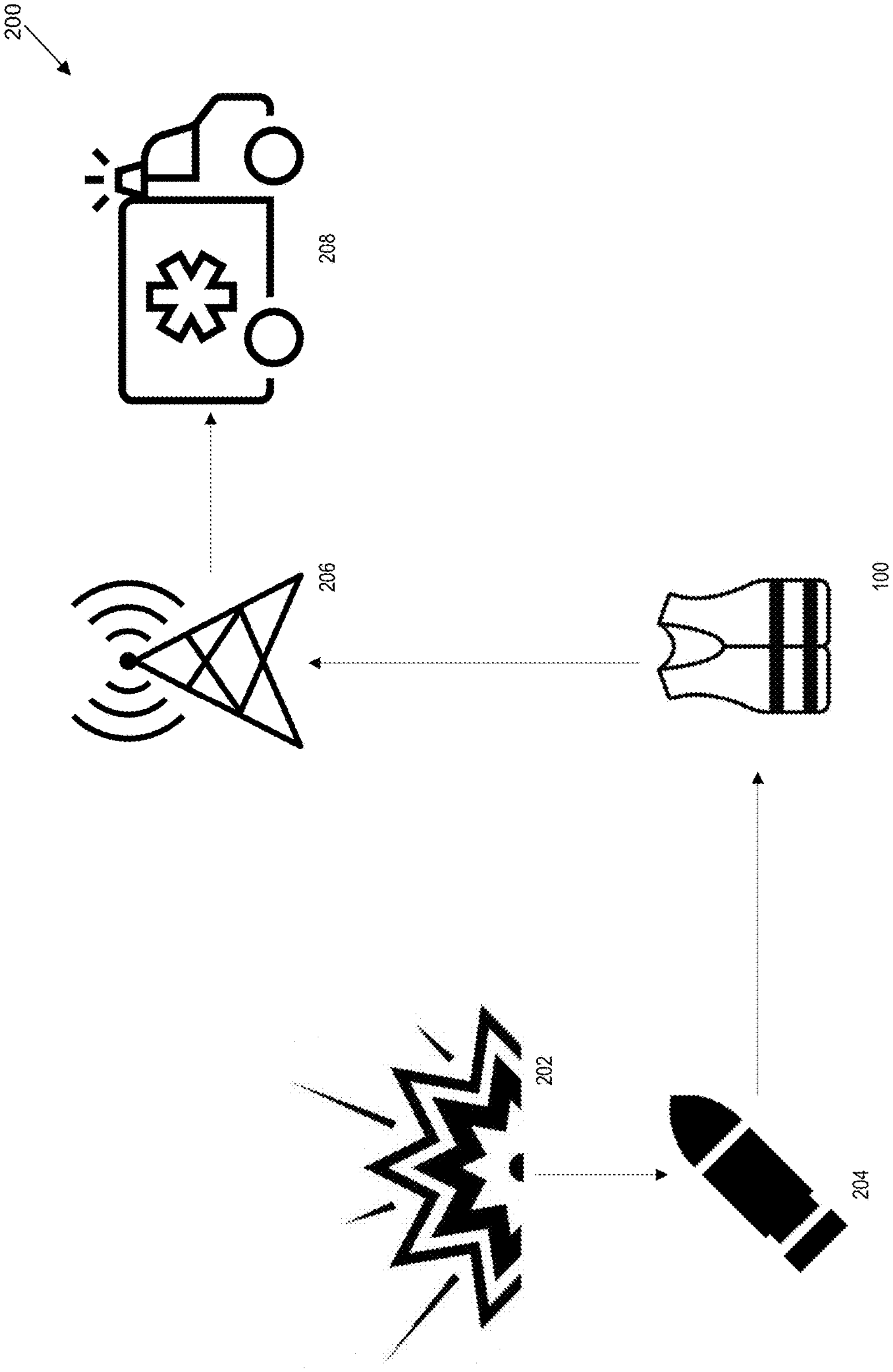
FIG. 2 is a block diagram of the notification system.

FIG. 2 illustrates a block diagram 200 of a notification generated by the notification system when a ballistic event occurs. A ballistic event 202 can occur near the ballistic vest 100. Ballistic projectile 204, such as a bullet or shrapnel, can either make contact with the ballistic vest 100 or come into the vicinity of the ballistic vest 100. The ballistic vest 100 can determine that a ballistic event occurred through the use of a sensor. For example, the sensor can be an energy wave detection sensor capable of measuring the energy level and energy waveform generated from a ballistic event. In one embodiment, the sensor is controlled by a computer or control system. The ballistic vest 100 can determine if a ballistic event occurred based on the received data from the sensor. For example, based on the received data from the sensor, the computer can determine the severity of the ballistic event and the distance the ballistic vest 100 is from the ballistic event, and based on the determination, the ballistic vest can determine whether emergency services 208 should be notified.

In one embodiment, the ballistic vest 100 can also be configured to provide additional safety features such as fall and electrical protection. For example, the high-visibility ballistic safety vest 100 may be configured to provide harness and D-Ring connection capability to protect a worker from injury due to falls. In addition, if the sensor includes an accelerometer, the high-visibility ballistic safety vest 100 may detect if a wearer has fallen. In another embodiment, the sensor can activate a camera to record and transmit visual information regarding the detected event.

A communication system can be attached to the sensor. For example, the communication device can be a cellular modem or a Bluetooth modem. A cellular modem allows the ballistic vest 100 to connect directly with a wireless network 206. A Bluetooth modem allows the ballistic vest 100 to be wirelessly coupled to a secondary wireless device that is connected to the wireless network 206. A notification system can generate a notification based on the ballistic event. The communication system can transmit the notification to the emergency services 208. In one embodiment, a computer or control system controls the communication system and notification system.

When a ballistic event 202 is detected by the ballistic vest 100, the communication system can notify emergency services 208 through the wireless network 206. For example, the emergency services 208 can be the police department, the fire department, a hospital, a private service, or any other emergency service. In one embodiment, the control system can be configured to wirelessly transmit data collected by the sensor concerning the detected event, such as location, time, or the type of event detected, over the wireless network 206 to the emergency services 208. In one embodiment, the ballistic vest 100 can include a manual switch configured to allow a wearer to activate one or more autonomous features. For example, the switch can be integrated into the surface of the ballistic vest 100. If a wearer presses the button, the onboard camera may be turned on, an emergency notification may be sent, or a two-way communication link may be established between the wearer and a third party such as emergency service personnel.

Figure 3:
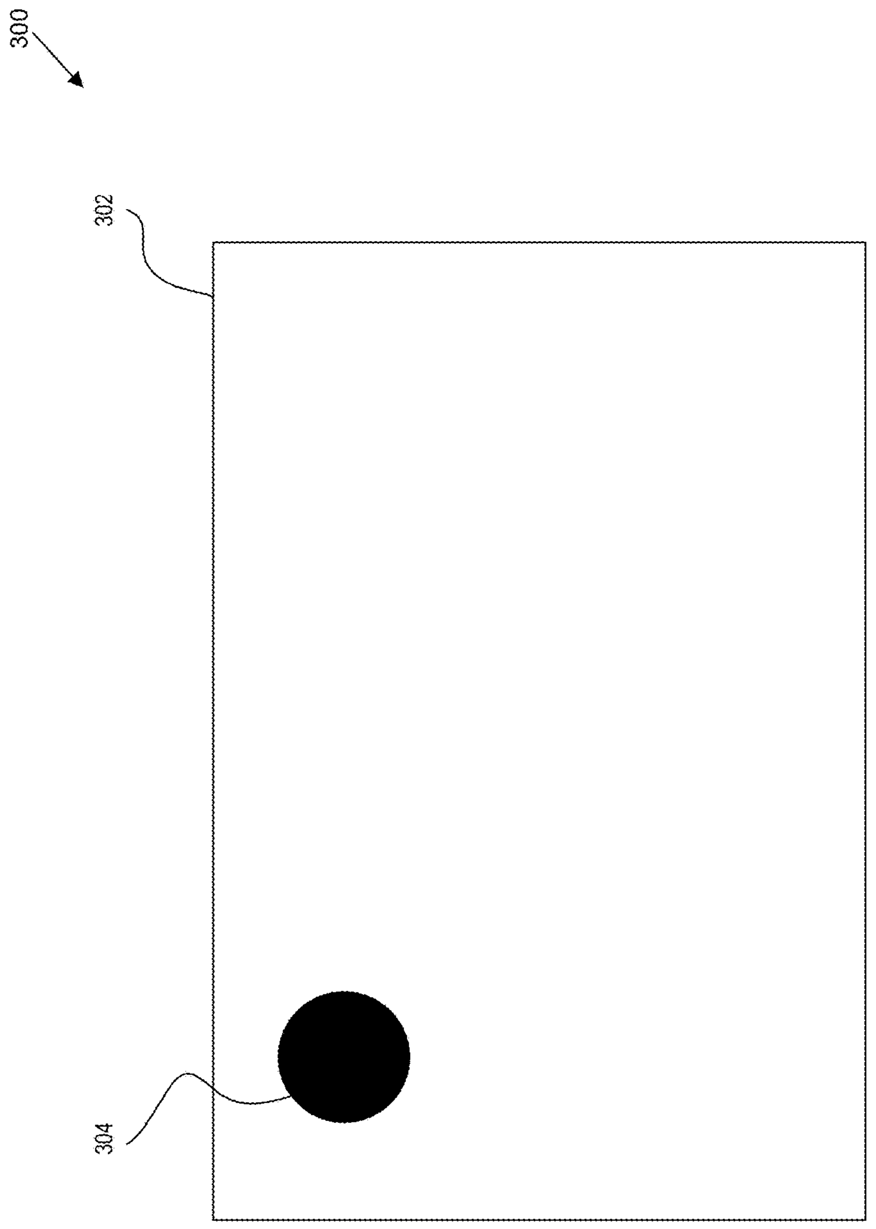
FIG. 3 is a block diagram of a front-facing view of the ballistic panel system.

FIG. 3 illustrates a block diagram of a front-facing view of the ballistic panel system 300. The ballistic panel system 300 can have a ballistic panel 302 and at least one sensor 304. The ballistic panel 302 can be configured to provide protection from impacts caused by projectiles by being constructed of a ballistic-resistant or hazard-resistant material. In one embodiment, the ballistic panel 302 can be constructed from non-woven aramid and UHMPE material. In another embodiment, the ballistic panel 302 can be constructed from a non-woven composite or metal material. The material can be lightweight with a variable thickness to meet a minimal weight and flexibility requirement in order to comply with a desired safety standard such as the National Institute of Justice or OSHA standards.

The sensor 304 can be an energy wave detection sensor, an accelerometer, a microphone, a camera, or a pressure sensor. For example, the microphone can detect and record a sound profile of a ballistic event. In another example, the pressure sensor can detect and record a change in pressure caused by a ballistic event. In one embodiment, a computer or control system can control the sensor 304.

The sensor 304 can be attached directly to the ballistic panel 302. In one embodiment discussed below in FIGS. 4*a* and 4*b*, the sensor 304 can be connected to an external power source remotely located from the sensor 304 with an electrical wire going through the ballistic panel. In another embodiment discussed below in FIGS. 4*c* and 4*b*, the sensor 304 and power source can be a single unit where the power source is mounted in the same location as the sensor 304. In one embodiment discussed below in FIGS. 4*a* and 4*d*, the sensor 304 can be mounted to the surface of the ballistic panel 302. In another embodiment discussed below in FIGS. 4*b* and 4*c*, the sensor 304 can be embedded into the ballistic panel 302.

Figure 4A:
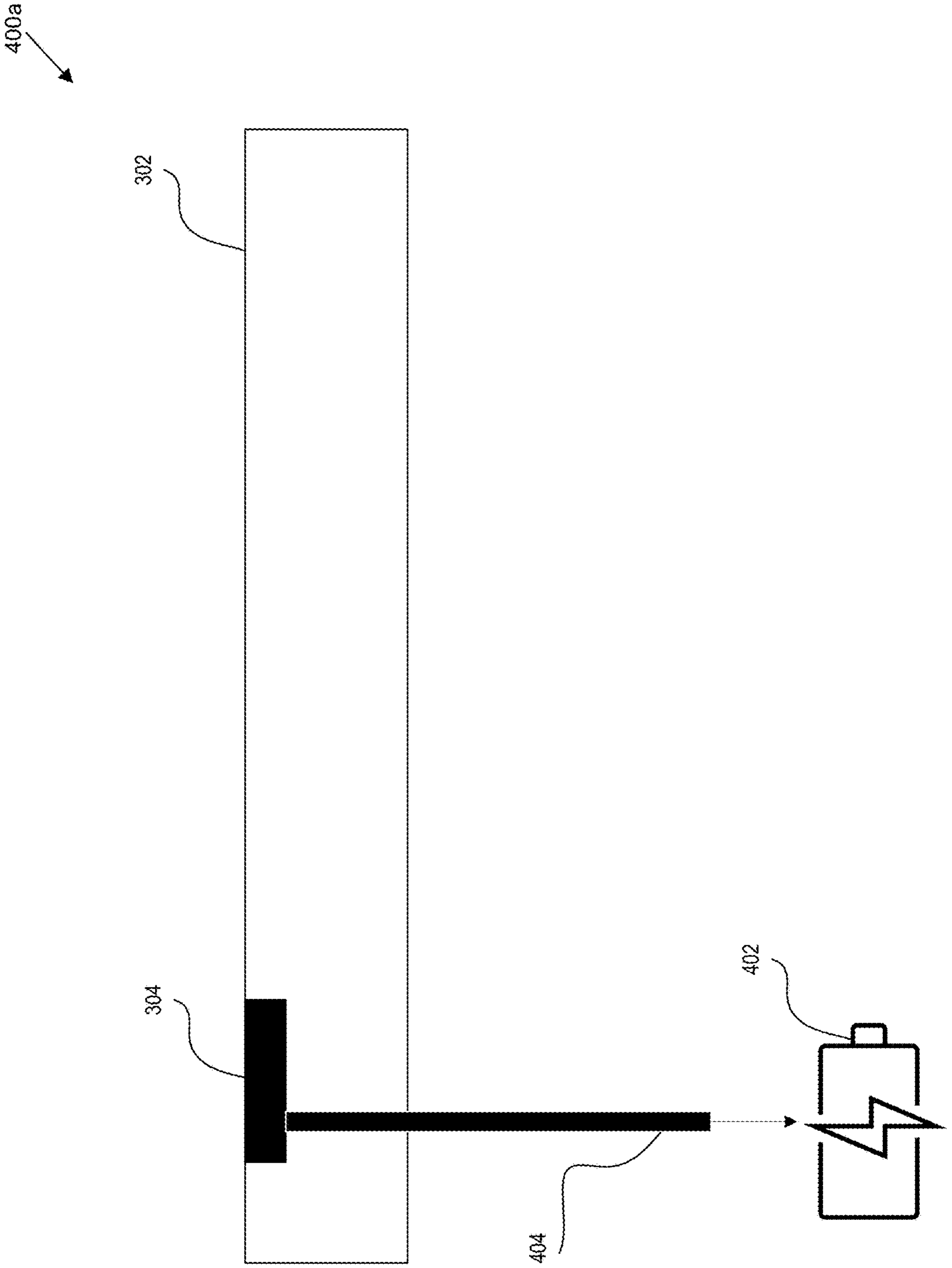
FIG. 4*a* is a block diagram of a wired embedded sensor.
Figure 4B:
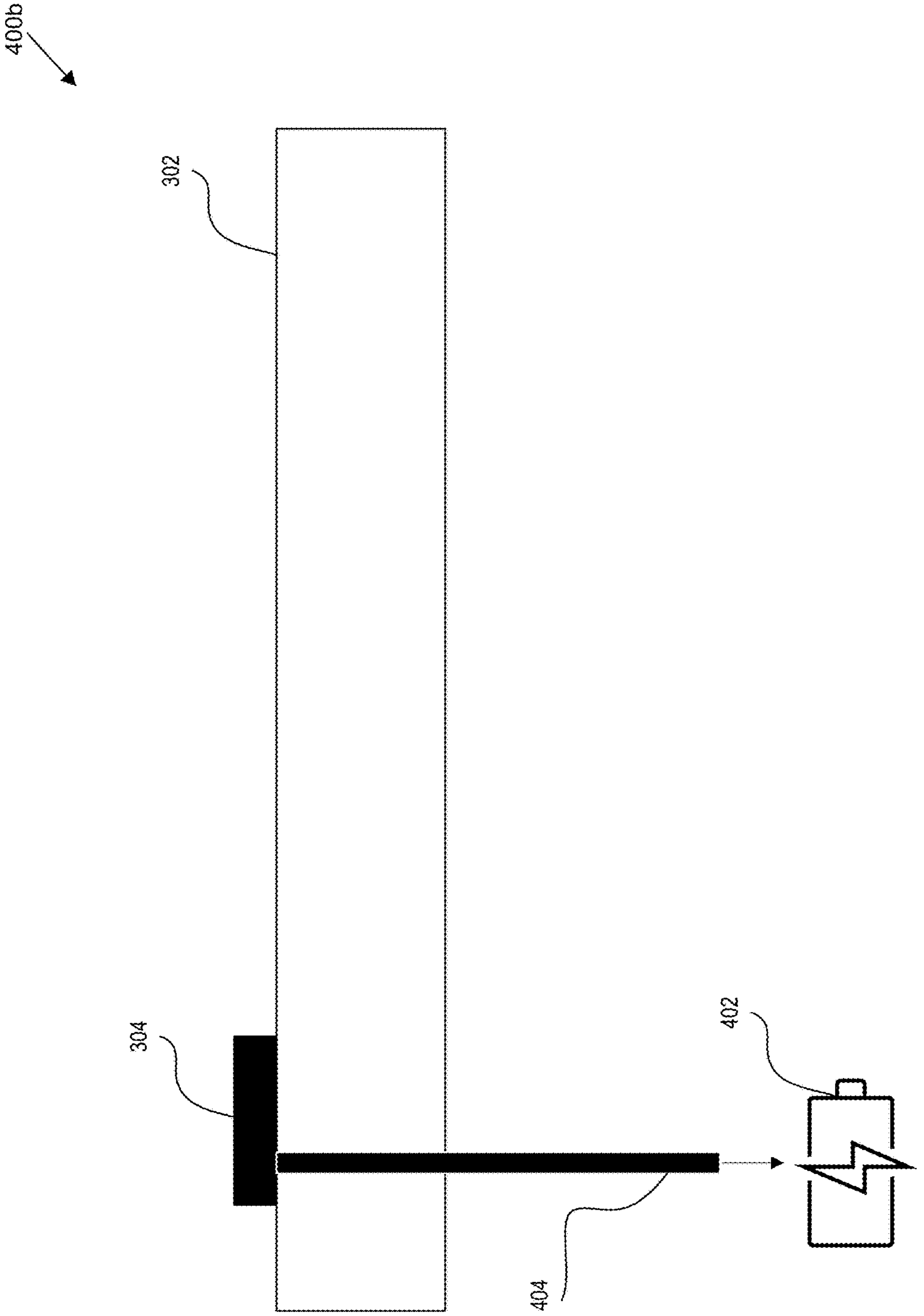
FIG. 4*b* is a block diagram of a surface-mounted wired sensor.
Figure 4C:
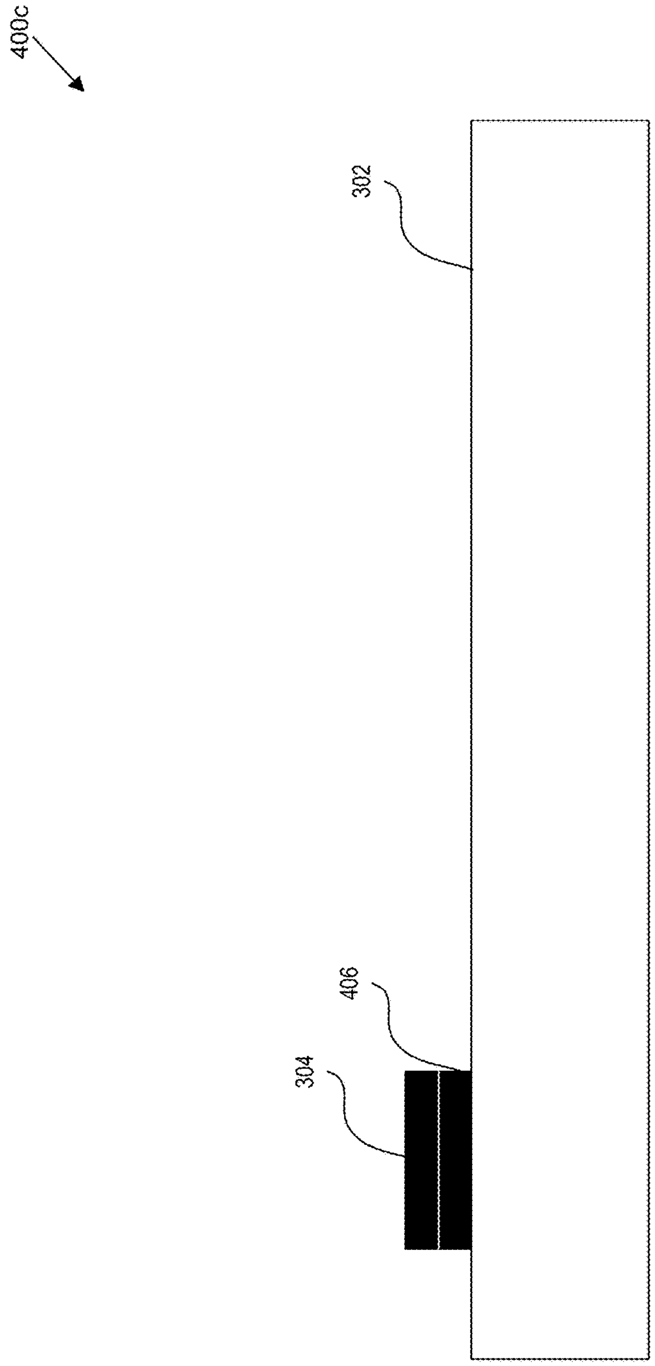
FIG. 4*c* is a block diagram of a surface-mounted wireless sensor.
Figure 4D:
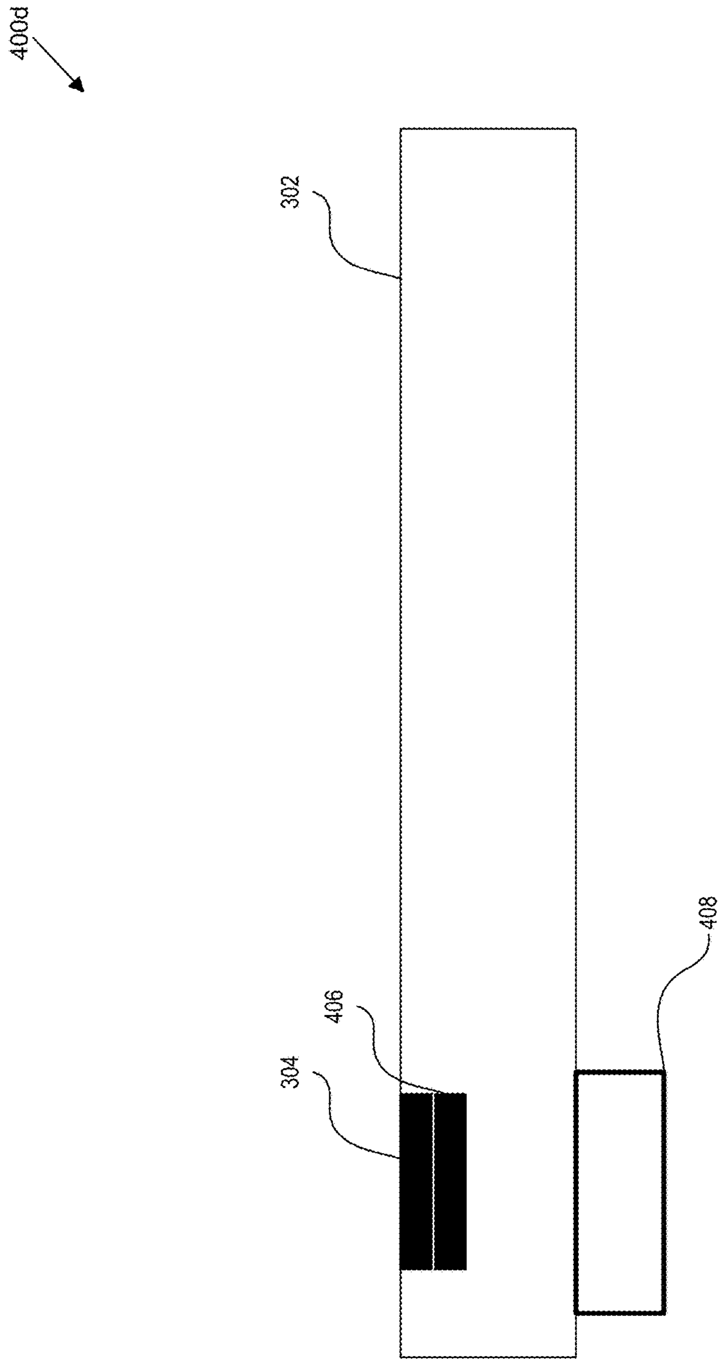
FIG. 4*d* is a block diagram of a wireless embedded sensor.

FIG. 4*a* illustrates a block diagram 400*a* of a wired embedded sensor 304. The sensor 304 can be embedded into the surface of the ballistic panel 302 to allow the sensor 304 to be flush with the surface. An electrical wire 404 can be attached to the sensor 304. The electrical wire 404 can connect the sensor 304 to a power source 402 by going through the surface of the ballistic panel 302. The power source 402 can be remotely located from the sensor 304.

FIG. **4*b* illustrates a block diagram 400*b* of a wired sensor 304 mounted to the surface of the ballistic panel 302. Mounting the sensor 304 to the surface of the ballistic panel 302 can allow the sensor to be more easily replaced compared to an embedded sensor configuration. An electrical wire 404 can be attached to the sensor 304. The electrical wire 404 can connect the sensor 304 to a power source 402 by going through the surface of the ballistic panel 302. The power source 402 can be remotely located from the sensor 304**.

FIG. **4*c* illustrates a block diagram 400*c* of a wireless sensor 304 mounted to the surface of the ballistic panel 302. Mounting the sensor 304 to the surface of the ballistic panel 302 can allow the sensor to be more easily replaced compared to an embedded sensor configuration. A battery 406 can be coupled directly to the sensor 304. For example, the battery 406 can be mounted underneath the sensor 304 and can be mounted to the surface of the ballistic panel 302. Coupling the battery 406 directly to the sensor 304 prevents the need to have a wire going through the ballistic panel 302**.

FIG. **4*d* illustrates a block diagram 400*d* of a wireless embedded sensor 304. The sensor 304 can be embedded into the surface of the ballistic panel 302 to allow the sensor 304 to be flush with the surface. A battery 406 can be coupled directly to the sensor 304. For example, the battery 406 can be mounted underneath the sensor 304 and can be embedded into the surface of the ballistic panel 302. Coupling the battery 406 directly to the sensor 304 prevents the need to have a wire going through the ballistic panel 302. A ballistic reinforcement panel 408 can be added to the ballistic panel 302. The ballistic reinforcement panel 408 can provide added ballistic protection in the location of the wireless embedded sensor 304**.

Figure 5:
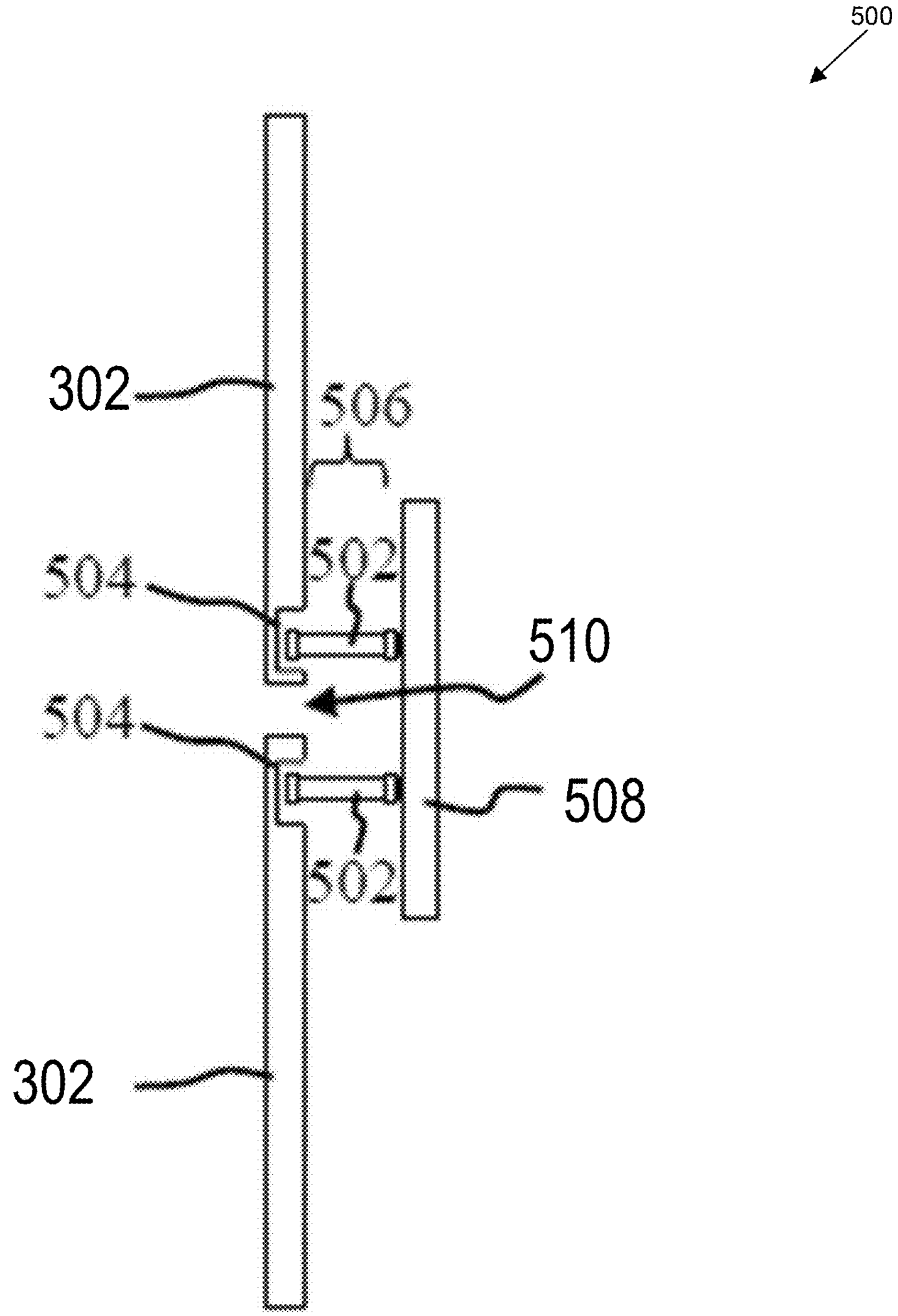
FIG. 5 is a block diagram of an interlocking ballistic panel system.

FIG. 5 illustrates a block diagram 500 of an interlocking ballistic panel system. To enhance the wearability, comfort, and protection of the ballistic vest 100, two or more protective panels can be positioned in a series of pockets disposed along the front and/or rear portion of the ballistic vest 100. To address potential ballistic travel of bullets and ballistic fragmentation between ballistic panels 302, a ballistic guard 508 constructed from the ballistic panel material can be positioned over the panel gap 510. The ballistic guard 508 can be of any suitable width to cover the panel gap 510. In one embodiment, the ballistic guard can have a width that exceeds the width of the panel gap 510 by a predetermined distance. The ballistic guard 508 can be positioned at a distance from the ballistic panel 302, allowing airflow between and through the ballistic panel 302 and the ballistic guard 508 while preventing a direct path through the ballistic panel system which a projectile or fragment could pass.

The ballistic guard 508 can be connected to ballistic panels 302 at the left and right or the top and bottom, with any suitable fastening system or device. The fastening system can include one or more spacers 502 attached to both the ballistic panels 302 and the ballistic guard 508 to create a second gap 506 for airflow. Each facing ballistic panel 302 may include at least one slot 504 for receiving the fastening system and spacer 502 to allow the ballistic panels 302 to be adjusted side to side relative to the ballistic guard 508 and an adjacent facing ballistic panel 302 to control a width of the panel gap 510 and to adjust the overall ballistic panel system during installation or system maintenance.

Figure 6:
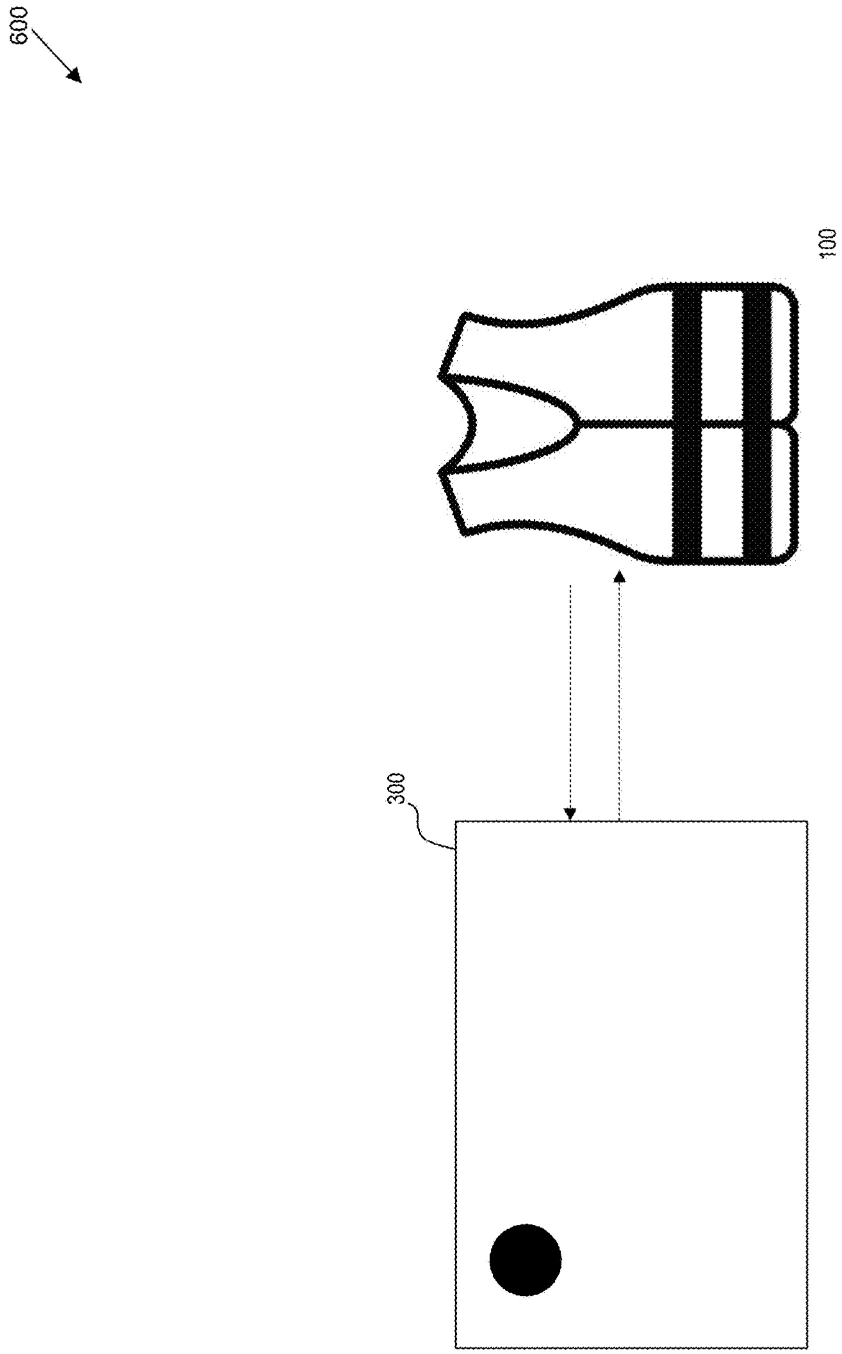
FIG. 6 is a block diagram of a removable ballistic panel system.

FIG. 6 illustrates a block diagram 600 of a removable ballistic panel system 300 from the ballistic vest 100. The ballistic panel system 300 can be housed in an interior pocket of the ballistic vest 100. The interior pocket can be configured to allow the ballistic panel system 300 to be removable. Allowing the panel to be removable facilitates the cleaning or replacing of the vest component of the ballistic vest 100. A removable system allows for an adjustment to the level of protection by allowing a different ballistic panel system 300 to be used depending on the requirements of the wearer. A wearer may select a different ballistic panel system 300 depending on the scenario; for example, a particular scenario can call for increased protection against a certain-sized ballistic object or the use of a particular sensor. Additionally, the removable ballistic panel system 300 allows for different-sized ballistic panels to be used, which can enhance the wearability and comfort of the ballistic vest 100.

Computer System

Figure 7:
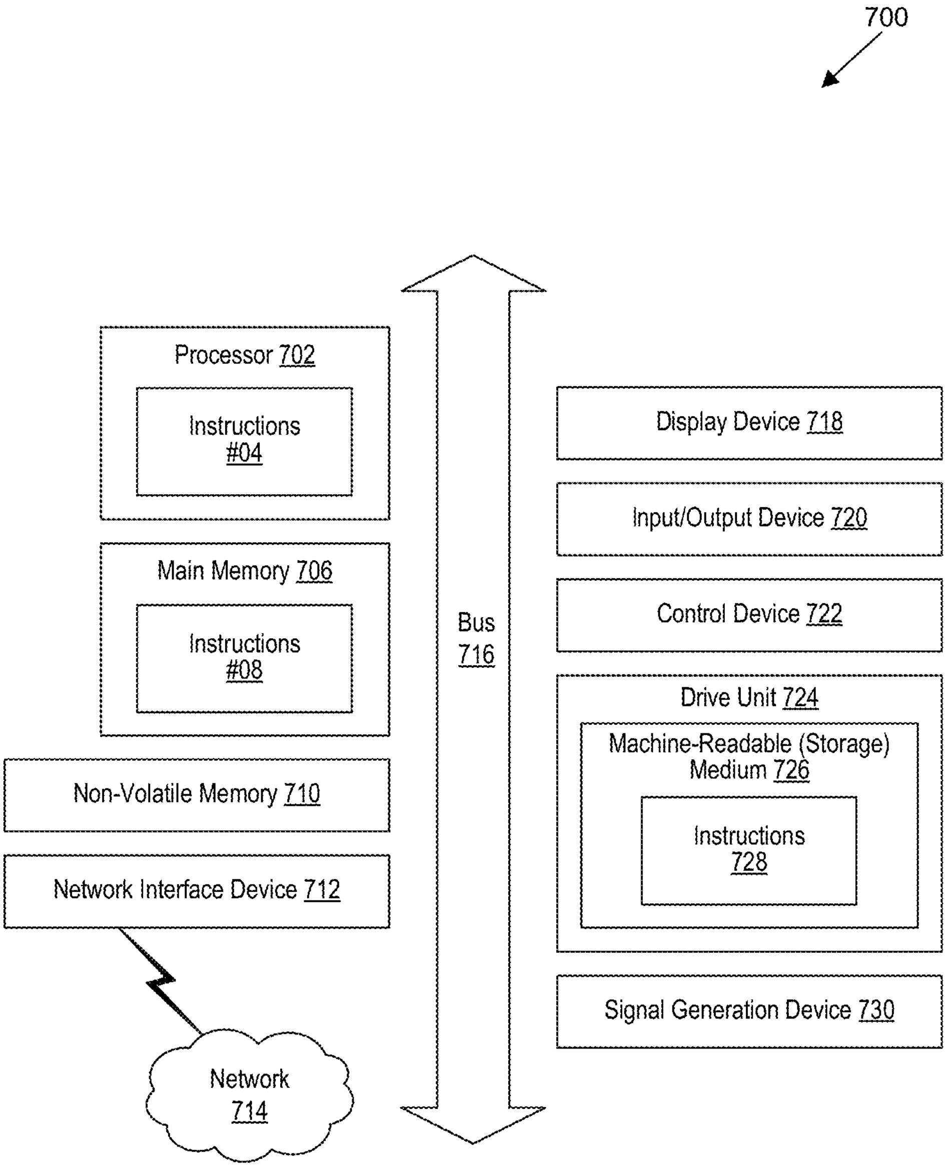
FIG. 7 is a block diagram that illustrates components of a computing device.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real time, in near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number can also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that can be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A ballistic vest system comprising:
a vest comprising:
one or more exterior pockets; and
multiple interior pockets,
wherein at least one interior pocket is configured to house a ballistic panel and at least one energy wave sensor, and
wherein a front of the vest and rear of the vest contain at least one interior pocket;
at least one ballistic panel,
wherein the at least one ballistic panel is configured to be housed in the interior pocket of the vest,
wherein the at least one ballistic panel is removable from the interior pocket of the vest, and
wherein the at least one ballistic panel is constructed from a ballistic-resistant material; and
a ballistic detection system comprising:
the at least one energy wave sensor configured to measure an energy level generated by a ballistic event within a predetermined distance of a wearer of the ballistic vest system,
wherein the at least one energy wave sensor generates an energy waveform based on the measured energy level, and
wherein the at least one energy wave sensor is mounted to the ballistic panel;
a notification system,
wherein the notification system configured to generate a notification to an emergency service when the energy waveform measured by the at least one energy wave sensor is indicative of a ballistic event; and
a power supply configured to supply power to the ballistic detection system.

2. The system of claim 1 wherein the vest further comprises:
at least one reflective panel,
wherein the reflective panel increases visibility of a wearer;
a harness; or
a grounding connector.

3. The system of claim 1, wherein the ballistic detection system further includes:
an accelerometer,
a microphone,
a camera, or
a pressure sensor.

4. The system of claim 1, wherein the notification includes:
a location of the detected ballistic event,
a time of the detected ballistic event, or a type of detected ballistic event.

5. The system of claim 1, wherein the notification system further comprises:
a modem,
wherein the modem is either a Bluetooth modem wirelessly coupled to a secondary wireless device or a cellular modem coupled to a wireless network.

6. The system of claim 1 further comprising:
a first ballistic panel disposed in a plane;
a second ballistic panel disposed in the plane; and
a third ballistic panel disposed away from the plane over a spacing between the first ballistic panel and the second ballistic panel,
wherein at least two spacers are disposed between the third ballistic panel and the first ballistic panel and the second ballistic panel to interlock each panel together and provide a flexible ballistic panel system with increased mobility,
wherein the first ballistic panel, the second ballistic panel, and the third ballistic panel are enclosed in a singular interior pocket of the vest.

7. The system of claim 1, wherein the ballistic detection system further comprises:
an activation button,
wherein the activation button activates at least energy wave one sensor, and
wherein the activation button activates the notification system.

8. A hazard safety vest comprising:
multiple interior pockets configured to each house a hazard-resistant panel,
wherein each hazard-resistant panel is removable from the interior pocket, and
wherein the hazard safety vest protects a wearer against a hazard; and
a hazard detection system comprising:
a sensor configured to detect a hazard event in a threshold vicinity of the hazard safety vest,
wherein the sensor is configured to measure an energy level generated by a hazard event within the threshold vicinity and to generate an energy waveform based on the measured energy level;
a notification system configured to generate a notification and communicate the notification to an emergency service in response to the energy waveform measured by the sensor being indicative of the hazard event; and
a power supply configured to supply power to the hazard detection system.

9. The hazard safety vest of claim 8 further comprising:
at least one reflective panel configured to increase visibility of a wearer;
a harness; or
a grounding connector.

10. The hazard safety vest of claim 8, wherein the sensor includes:
an energy wave sensor,
an accelerometer,
a microphone,
a camera, or
a pressure sensor.

11. The hazard safety vest of claim 8, wherein the notification includes:
a location of hazard event,
a time of the hazard event, or
a type of hazard event.

12. The hazard safety vest of claim 8, wherein the notification system further comprises:

a modem, wherein the modem is either a Bluetooth modem wirelessly coupled to a secondary wireless device or a cellular modem coupled to a wireless network.

13. The hazard safety vest of claim 8 further comprising:

at least two hazard-resistant panels, wherein the at least two hazard-resistant panels are contained in a singular interior pocket of the vest, wherein the at least two hazard-resistant panels interlock to provide increased mobility to a wearer.

14. The hazard safety vest of claim 8, wherein the hazard detection system further comprises:

an activation button, wherein the activation button is configured to activate the sensor, and wherein the activation button is configured to activate the notification system.

15. An apparatus for ballistic protection comprising:

a vest comprising:

at least one interior pockets, wherein at least one interior pocket is configured to house a ballistic panel and at least one sensor, and wherein a front of the vest and rear of the vest contain at least one interior pocket;

at least one ballistic panel, wherein the at least one ballistic panel is configured to be housed in the interior pocket of the vest, and wherein the at least one ballistic panel is constructed from a ballistic-resistant material; and a ballistic detection system comprising:

the at least one sensor configured to measure a ballistic energy level generated by a ballistic event within a threshold distance of the vest, wherein the at least one sensor generates an energy waveform based on the measured energy level;

a notification system, wherein the notification system generates a notification to an emergency service when the energy waveform measured by the at least one sensor is indicative of a ballistic event; and a power supply configured to supply power to the ballistic detection system.

16. The apparatus of claim 15, wherein the vest further comprises:

at least one reflective panel, wherein the reflective panel increases visibility of a wearer;

a harness; or a grounding connector.

17. The apparatus of claim 15, wherein the at least one sensor includes:

an energy wave sensor, an accelerometer, a microphone, a camera, or a pressure sensor.

18. The apparatus of claim 15, wherein the notification includes:

a location of the ballistic event, a time of the ballistic event, or a type of ballistic event.

19. The apparatus of claim 15, wherein the notification system further comprises:

a modem, wherein the modem is either a Bluetooth modem wirelessly coupled to a secondary wireless device or a cellular modem coupled to a wireless network.

20. The apparatus of claim 15 further comprising:

at least two ballistic panels, wherein the at least two ballistic panels are contained in a singular interior pocket of the vest, wherein the at least two ballistic panels interlock to provide increased mobility to a wearer.

* * * * *